March 24, 1942.  H. THOMA  2,277,465
HYDRAULIC DEVICE
Filed Sept. 28, 1937
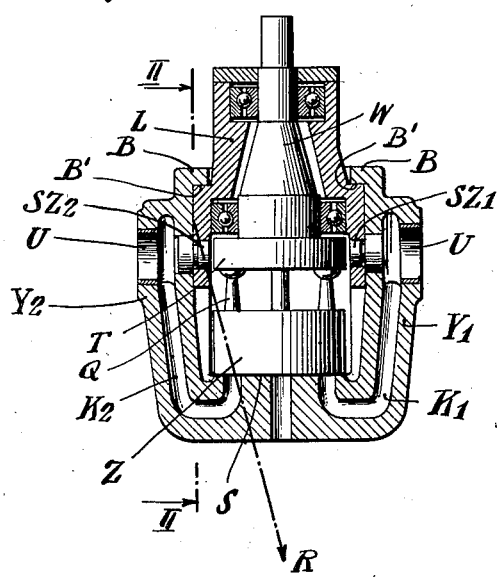
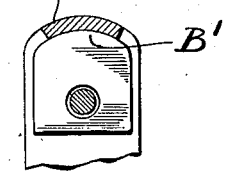
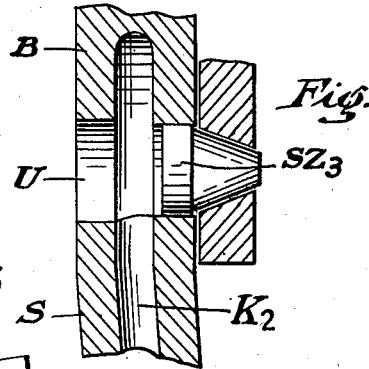
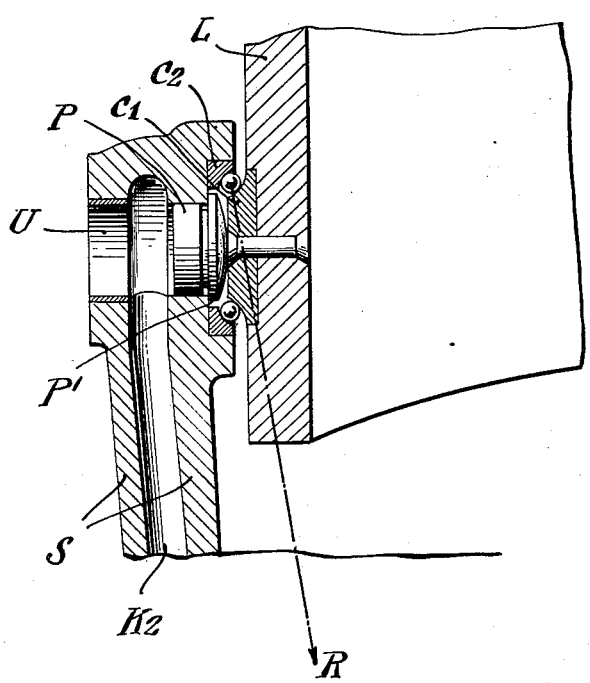
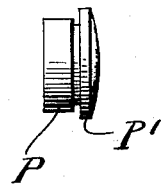
INVENTOR
Hans Thoma
BY
ATTORNEYS Patented Mar. 24, 1942

2,277,465

UNITED STATES PATENT OFFICE 2,277,465

HYDRAULIC DEVICE

Hans Thoma, Karlsruhe-Baden, Germany

Application September 28, 1937, Serial No. 166,077
In Germany October 2, 1936

4 Claims. (Cl. 103—162)

This invention relates to hydraulic devices and has for its object to improve known devices of this type by decreasing deformation of certain parts under the forces generated in operation.

In known hydraulic devices such for example as that shown in Thoma U. S. Patent 1,931,969, and Thoma application S. N. 17,409, filed April 20, 1935, having an oscillatable cylinder block carried by a cup-shaped housing or open yoke member, the latter member is located between extensions on the main body of the device and is pivoted thereto by outwardly extending journals on said yoke fitting in bearings on said extensions of the main body. As a result of this construction, the journals are rather widely separated, with the result that the bending stresses due to the force couple are very large. The yoke member in such devices embodies a valve plate upon which the cylinder block rotates. As the joint between the cylinder block and the valve plate must serve to seal fluids under very high pressure, a very close fit is required, and the slightest deformation of the valve plate will result in leakage and loss in efficiency.

It is an object of the present invention to improve such constructions by reducing the arm of the force couple by placing the pivot joints as near as possible to each other and as nearly as possible in line with the valve ports.

It is another object to construct the pivot joints in such a way that the ends of the yoke will be subject to a spreading force outwardly upon application of oil pressure so as to counteract and neutralize the bending stresses upon the valve plate.

Other and more detailed objects of this invention will become apparent from the following description of several modified forms of the invention taken in connection with the attached drawing, wherein:

Fig. 1 represents a longitudinal cross-sectional view of a variable volume hydraulic device, the shaft, operating flange, and cylinder block however, being shown in full;

Fig. 2 is a sectional view of part of the device of Fig. 1, taken on the line II—II of Fig. 1 looking in the direction of the arrows;

Fig. 3 is an enlarged partial view similar to Fig. 1 showing a modification; and Fig. 4 shows one of the elements of the form of device shown in Fig. 3.

Fig. 5 is a fragmentary view of a part of the device shown in Fig. 1 in which the pivot member is shown as conical in form.

In Fig. 1, W represents a rotating shaft of the device which may either be a variable volume pump or a variable volume hydraulic motor. T indicates a piston driving flange which is preferably made integral with the shaft W. Piston rods Q of usual form connect the pistons with said driving flange, the pistons being located in bores in the cylinder block Z, which rotates upon the valve surface S formed with ports for the intake and delivery of oil or other fluid, which ports communicate with inlet and delivery channels $K_1$ and $K_2$. The valve surface S is swingably arranged relative to the axis of the shaft W by means of yoke arms $Y_1$ and $Y_2$ pivoted to the main bearing carrying member L in which the drive shaft W is journaled. It will be noted that the arms $Y_1$ and $Y_2$ are formed with inwardly extending journal studs $SZ_1$ and $SZ_2$ mounted for oscillation in bearing holes in member L.

By means of this construction the pivots are brought as close as possible to the axis of shaft W so that the distance between the pivot and the center of pressure of the oil upon the yoke is decreased, whereby the deformation of the parts is very substantially decreased. Furthermore, the large forces involved are applied directly to the member L instead of more or less flexible extensions thereof. Therefore, said forces are transmitted directly to the bearing body L for the shaft W and directly from the shaft W to the bearing flange T. It will be noted that the holes U serving for the admission and delivery of oil, are made sufficiently large so that the bearing studs may be inserted therethrough.

Instead of depending entirely upon the strength and rigidity of the bearing studs, the deformation may be further reduced by providing the yoke arms with an upward extension formed with a cylindrical flange B bearing upon the rear side of a cylindrical bearing surface B' formed directly on body L. By this means the pivot studs will be relieved of considerable load.

In order to assemble and disassemble the parts, the yoke member must be swung away from the central position so far that the flanges B will move away entirely from the surfaces B' so that upon removal of the pivot studs the parts may be assembled or disassembled. It will be noted that both the pivot studs and the bearing surfaces B and B' lie as close as possible to the axis, thus providing for the most direct transfer of forces.

By suitably modifying the construction, the deformation of the valve plate may be further reduced by applying outwardly acting forces to the ends of the yoke arms which may be accomplished by forming the pivots of conical form, as by making them in the form shown at SZ₃ in Fig. 5.

At the left side of Fig. 1 a form of construction is shown in which certain oil pressure forces are utilized to prevent, or at least to reduce, the deformation of the valve plate. For this purpose, the pivot stud SZ₂ is provided with an appropriate shoulder bearing against the body L. Since the channel K₂ is subjected to oil under high pressure, the pivot stud SZ₂ is shifted slightly to the right and through a proper choice of the diameter of the pivot stud, the effect of the oil pressure may be so chosen that the change of form of the valve plate is minimized. By properly proportioning the pivot studs, the resulting force R is along the line of the arrow shown, whereby the bending moments upon the valve surface S, which are present in all other forms of construction, are entirely eliminated; thus the harmful deformation of the valve surface is prevented even though the parts are not constructed very massively.

The frictional resistance to the swinging of the yoke may be reduced by the utilization of roller bearings of various types or by using hydraulically balanced pressure compensated bearings to reduce or entirely remove this frictional resistance.

Fig. 3 shows a modification in which a cone or conical ball bearing is used to provide the desired reduction of deformation of the valve plate. The bearing body L carries the cone C₁ which cooperates with the opposing cone C₂ by means of bearing balls. The cone C₂ is firmly located in a counter bore of the swinging frame S which is connected with the valve plate. Upon the development of oil pressures, this conical bearing construction automatically provides the desired spreading forces so that the resultant of the various forces is indicated by the arrow R.

If desired, a further spreading effect may be created by providing the plunger P (Figs. 3 and 4). Upon the occurrence of oil pressure, plunger P will move to the right and apply the required spreading forces. This plunger construction may be used either with a simple cylindrical or conical bearing or with the ball bearing shown in Fig. 3. As shown, the plunger is provided at its inner end with a projecting flange P' to prevent its entering the channel K₂ in the absence of oil pressure.

It will be noted that the construction shown and described will serve admirably to accomplish the objects stated above. It is to be understood, however, that the constructions disclosed are intended merely as illustrative of the invention and not as limiting as various modifications therein may be made without departing from the invention as defined by a proper interpretation of the claims which follow.

I claim:

1. In a hydraulic device in combination, an operating shaft, a body within which said shaft is journaled, a cylinder block, an oscillatable member for supporting said cylinder block formed to embrace said bearing body, and means for pivoting said member relative to the bearing body comprising shouldered pivot studs extending inwardly from the oscillatable member and journaled in bearing apertures in said body with their shouldered portion lying against said body, said studs being movable axially relative to said oscillatable member.

2. In a hydraulic device in combination, an operating shaft, a body within which said shaft is journaled, a cylinder block, an oscillatable member for supporting said cylinder block formed to embrace said bearing body, and means for pivoting said member relative to the bearing body comprising pivoted studs having a cylindrical portion and a conical portion, the largest part of said conical portion being smaller in diameter than said cylindrical portion so as to define a shoulder, said cylindrical portion and conical portion being respectively journaled in the oscillatable member and the bearing body whereby a spreading force is applied to said oscillatable member upon the occurrence of thrust between said oscillatable member and bearing body.

3. The combination of claim 1 together with supplemental journal means comprising a segmental cylindrical flange on said member cooperating with a segmental cylindrical bearing surface on said body.

4. In a hydraulic device in combination, an operating shaft, a body within which said shaft is journaled, a cylinder block, an oscillatable yoke member for supporting said cylinder block, valve ports formed in said member, and means for pivoting the arms of said yoke member relative to the bearing body comprising pivot studs extending inwardly from the yoke member and journaled in bearing apertures in said body, said pivot studs being conical so as to apply a spreading force to said arms, which force is proportional to the fluid pressure within said device.

HANS THOMA.